Dec. 9, 1969    W. H. MOSER    3,482,717
SELF-UNLOADING TRAILER
Filed Oct. 5, 1967    3 Sheets-Sheet 1

INVENTOR
William Henry Moser

BY
ATTORNEY

Dec. 9, 1969  W. H. MOSER  3,482,717
SELF-UNLOADING TRAILER
Filed Oct. 5, 1967  3 Sheets-Sheet 2
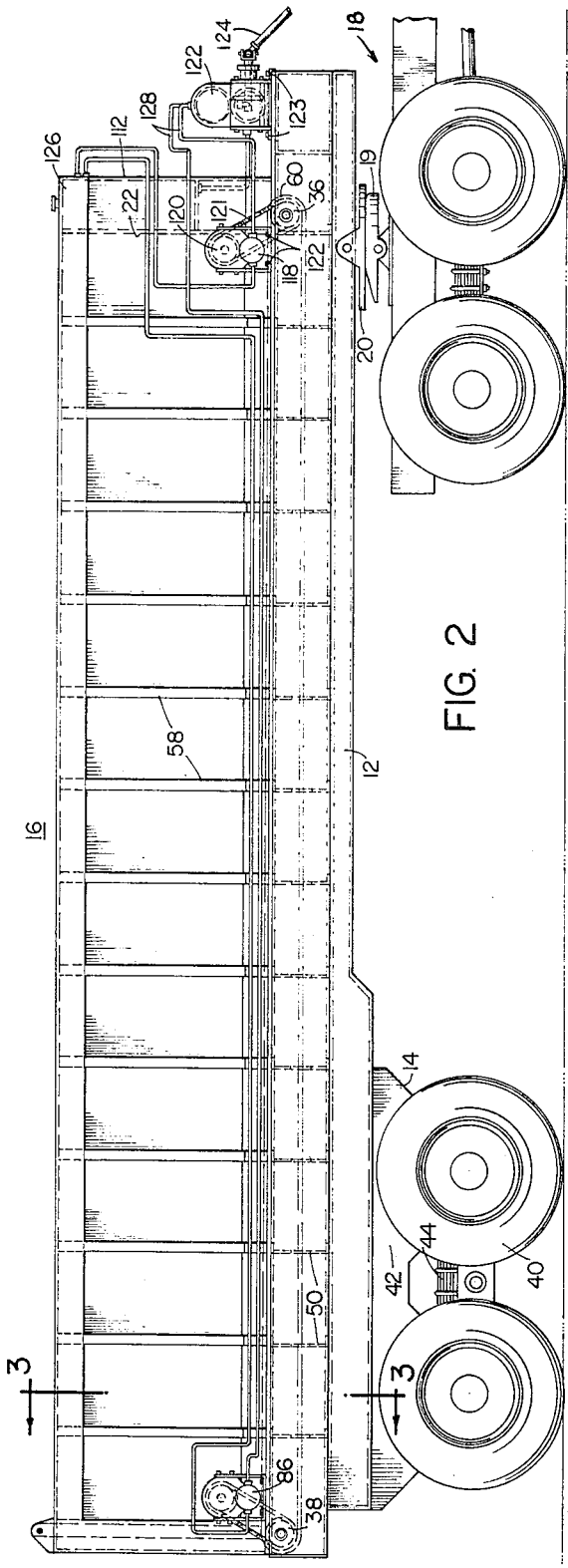
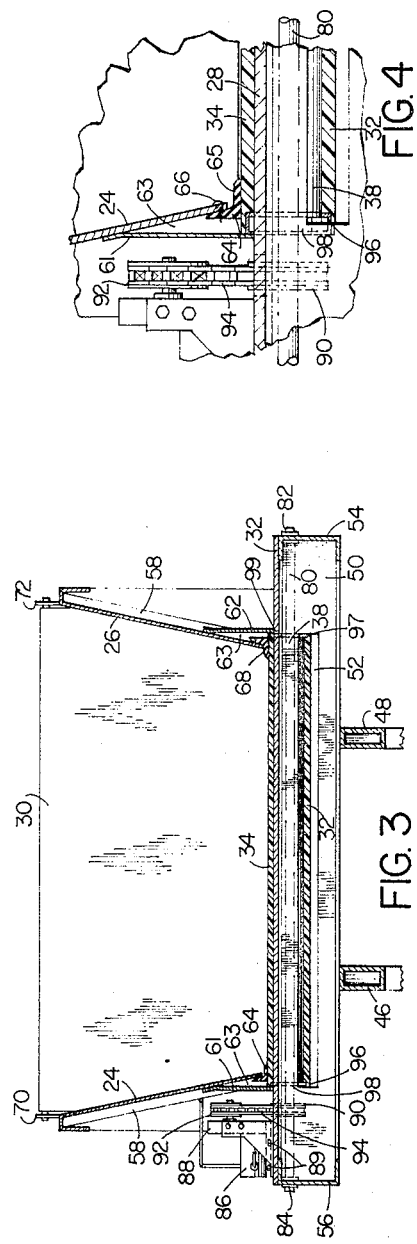
INVENTOR
William Henry Moser
BY
ATTORNEY Dec. 9, 1969  W. H. MOSER  3,482,717
SELF-UNLOADING TRAILER
Filed Oct. 5, 1967  3 Sheets-Sheet 3

INVENTOR
William Henry Moser

BY
ATTORNEY

United States Patent Office 3,482,717
Patented Dec. 9, 1969

3,482,717
SELF-UNLOADING TRAILER
William Henry Moser, Lamar County, Tex., assignor, by direct and mesne assignments, to CCI Marguardt Corporation, Tulsa, Okla., a corporation of Delaware
Filed Oct. 5, 1967, Ser. No. 673,043
Int. Cl. B60p 1/38; B65g 17/00
U.S. Cl. 214—83.36
10 Claims

ABSTRACT OF THE DISCLOSURE

This specification and drawings disclose a self-unloading trailer of a type having an endless conveyor belt associated with the floor of the trailer, the upper run of the conveyor belt being supported by and riding on the floor thereof.

---

Vehicles most often used for hauling and unloading aggregate materials are of the dump variety. The one most common is the conventional dump truck which comprises a standard truck frame having a dump bed and hydraulic lifting means mounted in place of the normal bed. Conventional dump trucks have two major disadvantages. First, they are small and therefore are not capable of carrying large or bulky loads, and secondly, an integral part of each dump truck is the expensive truck which cannot be separated therefrom for other uses and which must be insured, licensed, and maintained, however infrequently the dump truck is used. As construction has grown in scale and complexity, and the required material such as sand and gravel less abundant, it is not unusual for the materials to be hauled to the construction site from storage areas several miles away. Consequently, the dump truck has been replaced on many jobs by dump trailers.

A dump trailer has a much larger bed than that employed in dump trucks. The bed of the dump trailer is mounted on an over-the-road type trailer undercarriage along with the accompanying hydraulic cylinders, etc., necessary to raise the bed. These trailers are adapted to be pulled by a more or less conventional tractor having means for powering the dump beds hydraulic dump cylinders. Although dump trailers are much larger than the dump trucks and capable of carrying greater loads, they too have disadvantages. One particular disadvantage is that they often carry loads of gravel, sand, or hot asphalt, which may stick to the dump bed and refuse to slide out when the bed is raised. Thus, much time is lost in having to scrape out the bed, and even more often, damage is done to the trailer itself by shaking and hammering on the bed or repeatedly engaging and disengaging the dump mechanism to dislodge the congested material. A second disadvantage of the dump trailer is that the bed is considerably longer and heavier than of dump trucks. There is the ever present danger of the trailer overturning on soft or slanted ground due to the high center of gravity that exists when the bed is raised. A third disadvantage is that dump trailers cannot be unloaded when there are any overhead obstructions which the front of the bed might hit when it is raised. Also of importance is the fact that dump type vehicles are unable to dump their loads at the uniform rate of flow often desirable in roadway construction.

In accordance with the principles of this invention, a trailer is provided having an endless conveyor belt overlying the floor for automatically unloading materials carried in the trailer. In a preferred embodiment of the invention, a trailer is provided having an undercarriage, opposed sidewalls, a front wall, and a tailgate serving as a rear wall. An endless conveyor is mounted on the trailer in association with the floor in such a manner that the upper run of the conveyor belt overlies the trailer floor and is supported by and rides on the floor. The conveyor belt is further supported and driven by a roller at each end of the trailer and means are provided for turning the rollers in the same direction and at the same speed such that the upper run of the conveyor will be caused to move backward with respect to the trailer thereby causing material carried within the trailer and supported on the belt to flow out through the tailgate.

The novel features believed characteristic of this invention are set forth in the appended claims. The invention itself, however, as well as many advantages and features thereof, will best be understood by reference to the following detailed description of the preferred embodiment of the invention, when read in conjunction with the accompanying drawings wherein:

FIGURE 2 is a side elevational view of the trailer of FIGURE 1;

FIGURE 3 is a view in section taken along line 3—3 of FIGURE 2;

FIGURE 4 is an enlarged view of the gear and drive mechanism shown in FIGURE 3;

Figure 1:
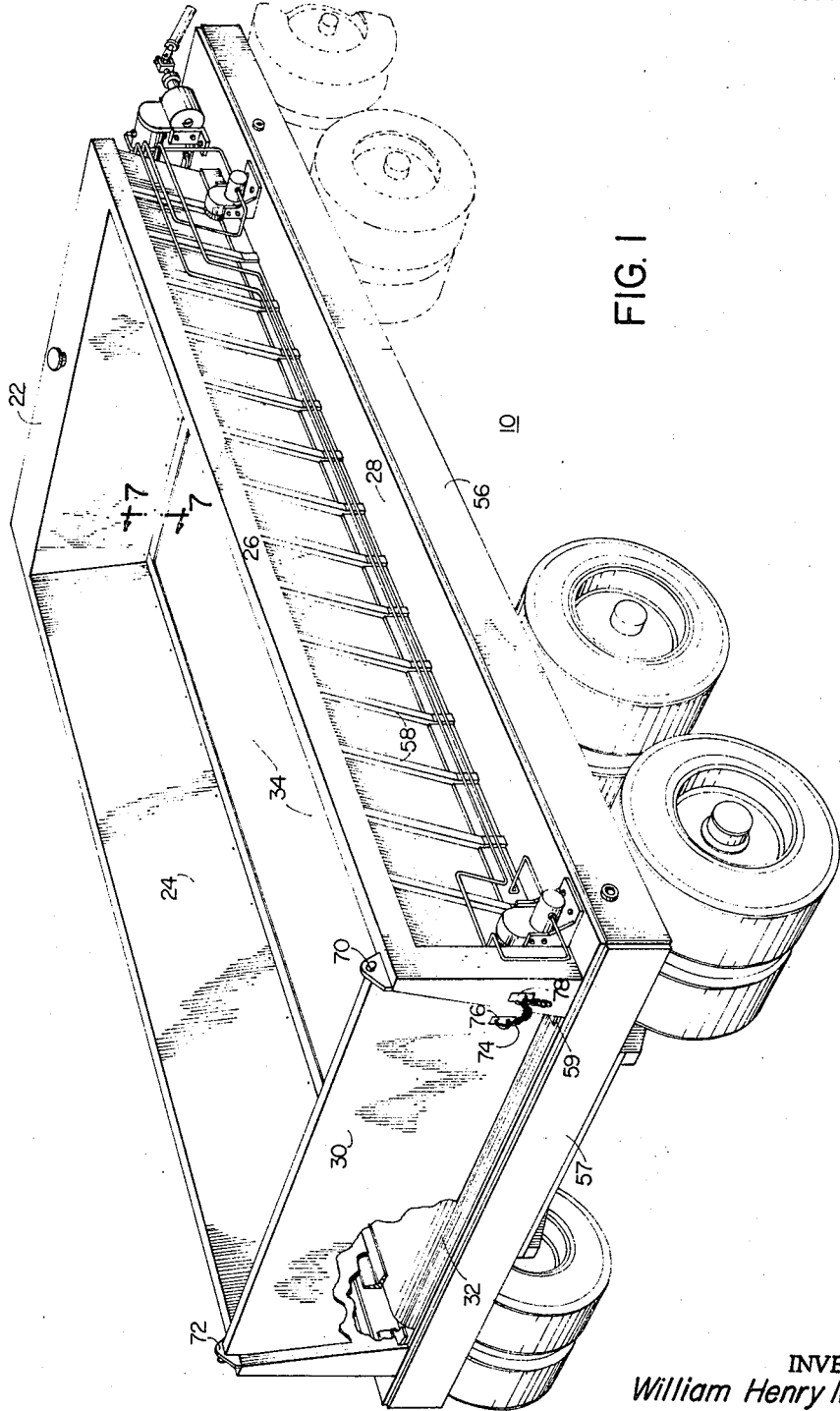
FIGURE 1 is a perspective view showing a trailer in accordance with the preferred embodiment of the invention.

Referring now to FIGURES 1 and 2 of the drawings, a trailer in accordance with the preferred embodiment of this invention is shown, denoted generally by the reference numeral 10. The major structural components of the trailer are a frame 12 supported by an undercarriage 14 and a body 16. A conventional pulling tractor 18 (partially shown) is releasably coupled to the trailer by a fifth wheel 19 which mates with a plate coupling 20 mounted at the lower front end of the frame 12. The body 16 comprises generally a front wall 22, opposing sidewalls 24 and 26, a floor 28 and a tailgate 30. An endless conveyor belt 32 is mounted in association with the floor 28 of the trailer and is adapted to have its upper run 34 overlying a central part of the upper surface of the floor. The belt 32 is supported and driven by a roller 36 at the front of the trailer and a roller 38 at the rear end thereof.

The undercarriage 14 of the trailer is of a conventional type and would normally comprise either one or two sets of wheels and axles 40 suspended from a carriage frame 42 on springs 44. A feature of the trailer of this invention is that the undercarriage may be mounted further forward than shown in the drawings to distribute the load evenly over the axles when the trailer is pulled by a single axle tractor. This is important in that most states have a limit of around 18,000 lbs. per axle for tractor-trailers that are driven over public roads. I will be noted that this advantage is peculiar to the non-dump type trailers in that dump trailers must have the undercarriage mounted far to the rear to keep the rear end of the trailer from pivoting too low for unloading or from hitting the ground when the bed is raised.

Referring also to FIGURE 3, it can be seen that the frame 12 comprises a pair of longitudinal box members 46 and 48. A plurality of channeled cross-members 50 are attached traversely on top of the box members and spaced along their length for supporting the floor. The channel members 50 each include a centrally disposed, elongated slot 52 for allowing passage of the lower run of the belt 32. A pair of end plates 54 and 56 are attached covering the ends of the channel members at either side of the trailer and run the full length thereof. A butplate 57 is attached across the back end of the frame between the end plates 54 and 56 to protect the rear roller 38 from damage which could occur in unloading operations or when the trailer is backed up to a dock. The floor 28 of the trailer suitably comprises heavy gauge sheet steel laid across the tops of the cross-members 50. A recess 59 is provided in the floor at the rear of the trailer for protrusion of the upper side of the rear roller 38 to the surface level of the floor and an opening 60 is provided in the floor at the front of the trailer for protrusion of the front roller 36 to the same level.

As may be most easily seen in FIGURE 3, the side walls 26 and 28 of the trailer are strengthened by vertically disposed stiffeners 58 which are attached to the outside thereof. The sidewalls 26 and 28 are flat and are inclined slightly inward so that material will feed easily from the trailer without sticking to the walls making the trailer essentially self-cleaning. Sidewall extension plates 61 and 62 are provided to attach the walls 24 and 26 respectively to the trailer floor 28 to seal the sides of the trailer and assist in supporting the side walls. Cavities 63 are formed by the lower portion of the side walls, the side wall extension members and the floor. In order to keep material carried in the trailer from seeping into the cavities, seals 64 and 68 are provided for sealing the space between the lower edge of the side walls and the upper surface of the belt. The seals are suitably made of rubber or similar synthetic material and may even be strips of the same material used for the belt. The seals are attached along the outside of the lower edges of the walls 24 and 26 respectively, suitably by bolts 66, and extend inwardly through the opening left between the lower edge of the walls and the belt 32. Thus, material carried in the trailer will bear down upon the upper surface 65 of the seals causing them to press down upon the belt 32 to prevent the passage of any of the material therebetween.

As previously mentioned, a tailgate 30 is provided at the rear end of the trailer. The tailgate is pivotally suspended from the upper rear corners of the walls 24 and 26 by brackets 70 and 72 respectively, so that it is free to swing backward and upward in response to the force of material against the front surface. To aid in obtaining a uniform flow of material through the tailgate, a chain 74 is provided which is attached to a lower edge of the tailgate 30 by a bracket 76. A bracket 78 is mounted on the adjacent side wall of the trailer for releaseably engaging the chain in various positions whereby the amount of tailgate opening may be limited or the tailgate may be held closed.

Figure 5:
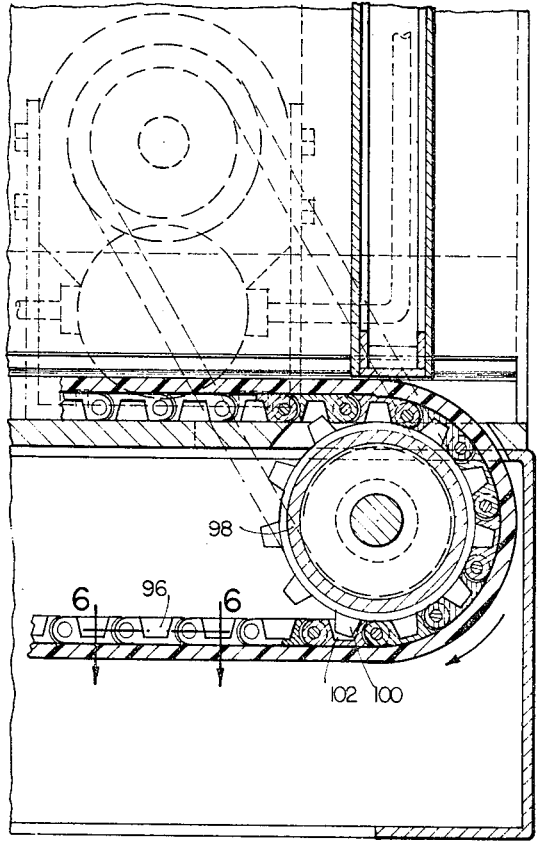
FIGURE 5 is a side elevational view in section taken along line 5—5 of FIGURE 3.

Referring now to FIGURES 3–5, it will be seen that the rear roller 38 is mounted on a traverse shaft 80 passing through its axis. The shaft 80 is rotatably supported at either end by bearings 82 and 84 in the side plates 54 and 56 respectively. A motor 86 and speed reducer 88 are mounted on the trailer adjacent to the roller shaft 80 suitably by bolts 89. A sprocket 90 is mounted on the shaft 80 in alignment with a second sprocket 92 on the speed reducer 88 and is connected thereto by a chain 94. Alternatively, the shaft may extend beyond the side plate and the speed reducer may be coupled directly to the shaft.

Although it has been found that the friction of the belt on the rollers is sufficient to keep it from slipping, it may be preferred to include a chain drive integral with the belt to prevent any undue stress being placed upon the belt and to insure that slippage does not occur. In accordance therewith, endless chains 96 and 97 are attached at either side of the belt 32. The chains engage spockets 98 and 99 respectively mounted on the shaft 80 for drive thereby.

Figure 6:
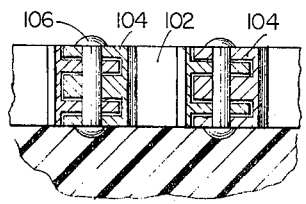
FIGURE 6 is a fragmentary view in section taken along line 6—6 of FIGURE 5.

Referring also to FIGURE 6, it will be seen that recesses 102 are formed in each length of the chains 96 and 97 between the hinge portions 104. The teeth 100 of the spockets 98 and 99 fit in the recesses 102 as the chain 96 passes over the spockets and the edges of the teeth 100 engage the sides of the hinge portion 104 of the chain lengths for driving the chains. Pins 106 are provided for flexibly connecting the lengths of chain together.

Figure 7:
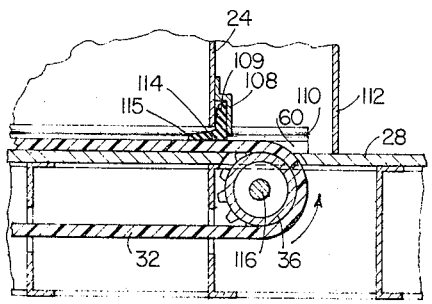
FIGURE 7 is a fragmentary side elevational view, in section, taken along line 7—7 of FIGURE 1.

FIGURE 7 is a fragmentary view, in section, showing the configuration of the front of the trailer and the front roller 36. As shown therein, a double angled front wall extension 108 is attached to the lower front side of the front wall, leaving a cavity 109 of the wall between the extension and the lower front portion.

As with the sidewalls a seal 114 is provided in the cavity 109 with one side 115 of the seal extending inwardly between the lower edge of the front wall 22 and the belt 32. Material carried in the trailer will bear down upon the top of the side 115 of the seal pressing it against the belt 32 to keep the material from seeping out therebetween. As also shown therein, a plate member 110 connects the front wall extension 108 to a baffle wall 112 to further strengthen the front wall.

As can also be seen in FIGURE 7, the front roller 36 is mounted on a traverse shaft 116 which passes through its axis with the upper edge of the roller extending upwardly through the openings 60 formed in the floor 28 such that the top surface of the roller is level with the top surface of the floor. It will also be noted that the opening 60 is large enough to allow passage of the belt 32 carried by the roller 36. As shown in FIGURES 1 and 2, a motor 118 and speed reducer 120 are mounted on the trailer adjacent to the front roller 36 by bolts 122. A chain 121 connects the shaft 116 to the speed reducer 120. The front sprocket and the spockets for driving the belt chains 96 and 97 are the same as those previously described for the rear roller and are therefore not shown in the drawings.

A double acting hydraulic pump 122 is provided for powering the motors 86 and 118. The pump 122 is suitably driven by a power take-off 124 from the tractor 18, and is supplied with hydraulic fluid from a reservoir 126 at the top of the front wall of the trailer through hydraulic lines 128.

Figure 8:
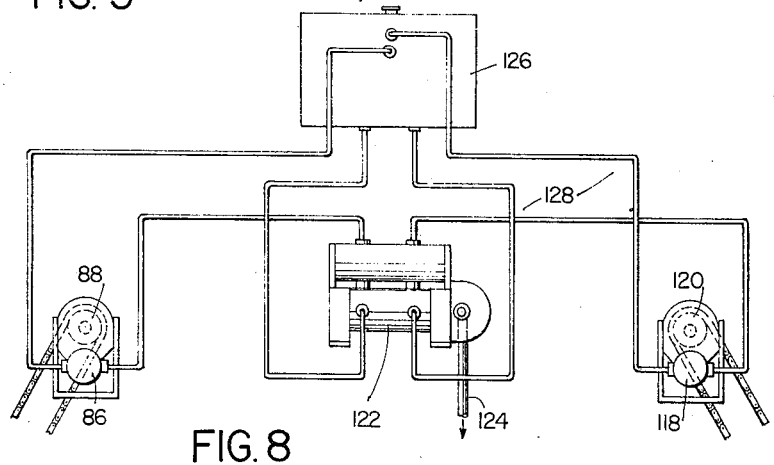
FIGURE 8 is a schematic diagram of a hydraulic power system used in the preferred embodiment of the invention.

FIGURE 8 shows the hydraulic system of the trailer diagrammatically. As shown therein, a power take-off 124 connects to and drives the double acting hydraulic pump 122. Fluid supplied to the pump from the reservoir 126 is pumped through the hydraulic lines 128 to actuate the hydraulic motors 86 and 118. As motors of this type operate at a relatively high speed, speed reducers 88 and 120 are provided to reduce this speed to a useful driving range for the belt. The purpose of using a double acting hydraulic pump is to drive both motors and thereby both rollers at the same speed to prevent the undue stress on the belt which would result when one roller was driven at a faster rate than the other.

As previously discussed, the trailer of this invention is particularly adapted for highway construction type operation in that large loads of any type of aggregate material from gravel to hot asphalt mix may be carried. It has been found that a belt made of a synthetic material and having a nylon or similar core, is sufficiently strong to withstand the stresses put on the belt by the heavy loads and to resist any ill-effect due to weather or the high temperatures of hot asphalt.

In operation this trailer has been found to be vastly superior to the dump type vehicle. The trailer is more versatile and economical than dump trucks because it has a much larger capacity and can be unloaded in many places that a dump truck or dump trailer cannot. A particular advantage is that it can be used to spread aggregate materials without the necessity of a separate spreader because of the even flow of unloading that can be obtained either with the trailer stationary or moving forward. The configuration of the rear end of the trailer also allows it to be pushed by a machine into which it is unloading. This is especially useful for operations such as laying asphalt in that the asphalt spreader can push the trailer forward as the asphalt mix is unloaded from the trailer into the spreader. The trailer of this invention is also adapted to many types of construction operations due to its ability to unload at a constant rate while being pulled forward. This is accomplished by engaging the power take-off to activate the hydraulic pump while the tractor is pulling the trailer forward. Due to the fact that the power take-off is geared directly to the transmission of the tractor, any variation in the speed of the tractor due to an increase or decrease in the engine speed will cause a like increase or decrease in the speed of the power take-off, in turn causing like increase or decrease in the speed of the belt and thus in the speed of unloading. This feature of the trailer tends to maintain uniformity in the amount of material unloaded per increment of forward travel of the trailer. Thus, it is possible to maintain a much more constant level of material flow than is possible with a conventional type dump vehicle.

Though this invention has been described with reference to a preferred embodiment thereof it is understood that the description is not to be construed in a limiting sense. Various modifications of the disclosed embodiment as well as other embodiments of the invention will become apparent to persons skilled in the art upon reference to the foregoing description.

What is claimed is:

1. A self-unloading cargo body to be carried by a vehicle frame including a pair of spaced apart, longitudinal support members comprising a body including a substantially flat, load supporting floor, opposed side walls and a front wall, an endless conveyor mounted in said body in association with the floor thereof, said conveyor comprising a pair of rollers mounted at each end of said body and an endless belt supported by said rollers such that the upper-run of said belt slides directly on the top surface of said floor without rollers therebetween and the lower-run passes beneath it, and means coupled to at least one of said rollers for driving said at least one roller, said body further including a plurality of transverse, spaced apart cross members attached to said vehicle frame and supporting said floor above said frame, each of said cross members defining a horizontally disposed slot through which the lower-run of said endless belt passes, the length of said slots being greater than the separation between said longitudinal support members and at least as great as the width of said belt, said cargo body being adapted to carry and unload loads in excess of 10,000 pounds.

2. A self-unloading trailer as defined in claim 1 wherein said side walls are flat and further including means supporting said side walls with lower edge of said side walls positioned over the upper-run of said belt and sealing means sealing the space between the lower edge of said side walls and the upper surface of said belt.

3. A self-unloading trailer as defined in claim 2 wherein said front wall is flat and further including means supporting said front wall over said front roller and sealing means sealing the space between the lower edge of said front wall and the upper surface of said belt.

4. A self-unloading cargo body as defined in claim 2 wherein said side walls are supported in an inclined position.

5. The self-unloading cargo trailer as defined in claim 1 wherein said means for driving said rollers comprise a pair of motors, a pair of speed reducers, means coupling each of said rollers to one of said motors of said speed reducers, a double acting hydraulic pump, fluid lines for supplying hydraulic fluid from said pump to said pair of motors whereby said pair of motors drive said rollers at the same speed and in the same direction, and means for connecting said hydraulic pump to a power source.

6. A self-unloading cargo body as defined in claim 1 further including a tail gate, means pivotally mounting said tail gate from the upper rear portions of said side walls and means for limiting pivotal movement of said tail gate for controlling the flow of material from said cargo body.

7. A self-unloading cargo body to be carried by a vehicle frame comprising a body including a load supporting floor, opposed side walls and a front wall, an endless conveyor mounted in said body in association with the floor thereof, said conveyor comprising a pair of rollers mounted at each end of said body and an endless belt supported by said rollers such that the upper run of said belt slides on the top surface of the floor and the lower-run passes beneath it, means coupled to said rollers for driving them in the same direction and at the same speed, said side walls being flat and further including means for supporting said side walls in an inclined position with the lower edge of said side walls positioned over the upper run of said belt, sealing means sealing the space between the lower edge of said side walls and the upper surface of said belt, said side walls further including side wall extensions extending along each of said side walls and connecting said floor and the outer surface of said side walls to seal the sides of said body and assist in supporting said side walls, the opposed edges of said endless belt each extending into cavities defined by said floor, said side wall extensions and the lower portions of said side walls.

8. A self-unloading cargo body as defined in claim 7 further including a tail gate, means pivotally mounting said tail gate from the upper rear portions of said side walls and means for limiting pivotal movement of said tail gate for controlling the flow of material from said cargo body.

9. A self-unloading cargo body as defined in claim 7 wherein side portions of said floor extend outside the line of said side walls on either side of said trailer and wherein said means supporting said side walls comprise a plurality of vertically disposed members attached to the outer surface of said side walls and said wall extensions and supported upon said outside portions of said floor.

10. A self-unloading cargo body as defined in claim 7 wherein a front portion of said floor extends forward to said front roller and wherein said means supporting said front wall comprise a member connected to the lower edge of said front wall and protruding down and forwardly therefrom and supported on said front portion of said floor.

References Cited

UNITED STATES PATENTS

| | | | |
|---|---|---|---|
| 1,945,532 | 2/1934 | Lima | 214—83.36 |
| 2,507,252 | 5/1950 | Hoover | 214—83.36 |
| 2,805,784 | 9/1957 | Dokken | 214—83.36 |
| 3,164,276 | 1/1965 | Bastian | 214—83.36 XR |
| 3,247,983 | 4/1966 | Thompson | 214—83.36 XR |
| 3,317,066 | 5/1967 | Hamm | 214—83.36 |

ALBERT J. MAKAY, Primary Examiner

U.S. Cl. X.R.

198—137